United States Patent [19]

Hacker et al.

[11] Patent Number: 4,590,256
[45] Date of Patent: May 20, 1986

[54] REACTION RESINS FOR IMPREGNATING AND CASTING LARGE-VOLUME COMPONENTS

[75] Inventors: Heinz Hacker, Nuremberg; Walter Ihlein, Berlin; Heinz-Klaus Laupenmuhlen, Hemhofen; Willi Mertens, Berlin, all of Fed. Rep. of Germany

[73] Assignee: Siemens Aktiengesellschaft, Munich, Fed. Rep. of Germany

[21] Appl. No.: 775,706

[22] Filed: Sep. 13, 1985

Related U.S. Application Data

[63] Continuation of Ser. No. 635,424, Jul. 30, 1984, abandoned.

[30] Foreign Application Priority Data

Jul. 29, 1983 [DE] Fed. Rep. of Germany ....... 3327708

[51] Int. Cl.$^4$ ............................................. C08G 59/68
[52] U.S. Cl. ...................... 528/93; 525/504; 528/408
[58] Field of Search .................... 525/504; 528/93, 408

[56] References Cited

U.S. PATENT DOCUMENTS 3,556,925  1/1971  Mertens .
4,026,862  5/1977  Smith et al. ...................... 528/93 X

FOREIGN PATENT DOCUMENTS 0034309  8/1981  European Pat. Off. .

OTHER PUBLICATIONS

Chemical Abstracts 99, 39484e (1983).
U.S. application Ser. No. 733,398, Reiner Habrich, filed 5/10/85.

*Primary Examiner*—Earl Nielsen
*Attorney, Agent, or Firm*—Kenyon & Kenyon

[57] ABSTRACT

The invention relates to reaction resins formed from anionically polymerizable di- or tri-functional epoxy compounds which are suitable for impregnating and/or casting large-volume parts. Such reaction resins therefore contain tertiary amine polymerization catalysts of the general formula

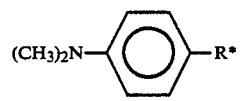

in a concentration of 0.5 to 10 mass parts, relative to 100 mass parts epoxy compound.

8 Claims, No Drawings

REACTION RESINS FOR IMPREGNATING AND CASTING LARGE-VOLUME COMPONENTS

This application is a continuation of application Ser. No. 635,424, filed July 30, 1984, now abandoned.

BACKGROUND OF THE INVENTION

The invention relates to reaction resins formed from anionically polymerisable di- or tri- functional epoxy compounds which are useful for impregnating and/or casting large-volume components, especially for cryotechnology.

The use of plastics such as impregnating resins, especially in cryotechnology, poses a problem because of the insufficient mechanical strength and flexibility of the plastics within a temperature range from about 4 to 100 K. Impregnating resins for large-volume components, for instance, those which serve for impregnating superconducting magnet coils, must meet a number of requirements which until development of the present invention could not be completely met. These are:

low starting viscosity (about 20 to 100 mPa. sec)
long use time (up to 50 hours at the impregnating temperature)
high mechanical strength level
good adhesion on alloy steels and nonferrous metals (NE-metals)
temperature-cycle resistance
high reaction shrinkage in the liquid phase and low reaction shrinkage in the gel phase, as well as
optionally, high radiation resistance (up to $3.10^6$ kGy).

Some reaction resin molded materials which are useful for cryotechnology and have improved strength and flexibility are known. These are, for instance, addition products based upon bisphenol-A-epoxy resins, dodecyl-succinic acid anhydride and aliphatic tricarboxylic acids as well as those based upon a mixture of bisphenol-A-resin, aliphatic epoxy resin, diurethane prepolymers and 4,4'-methylene-bis(2chloroaniline). Such compounds, however, generate only limited improvements.

Partially-crystalline cross-linked polymers are also known as thermal and electrical insulating material for cryotechnology. These polymers have a melting enthalpy of 30 to 80 $kJ:kg^{-1}$ and have sequences which consist of 2 to 14 methylene groups and are connected to each other by oxycarbonyl groups (European Patent Application No. A1-0 042 356: page 8, claims 1 to 4). Such polymers, which are used in the form of vessels and tubes or as a component of laminates and composite materials, are, for example, cross-linked products of crystalline aliphatic polyesters with a molecular weight between 1,000 and 10,000, which contain acid end groups, and cross-linking agents (hardening agents) with at least three epoxy groups. In these systems, the high viscosity and the short use time have a detrimental effect.

There has also been described an insulating system for magnets used in fusion and high energy research which is suitable for winding temperatures in the range of −270° to +155° C. and said to have high radiation resistance and excellent mechanical strength ("Brown Boveri Mitteilugen", vol. 65, (1978), pages 326 to 333). The impregnating resin of this insulation is a modified radiation-resistant epoxy resin of the bisphenol-A-type, an anhydride hardener and a latent accelerator. It is believed that large insulating thicknesses and large coils which require considerable volumes of resin can be impregnated. Also known are impregnating resins of epoxies and primary or secondary amines as hardeners.

It is found in practice, however, that with large-volume parts, the use time of additively hardening systems, i.e., of systems of epoxies and acid anhydrides and primary or secondary amines, respectively, is barely sufficient because of the long times required for saturation, and that hardening temperatures are often necessary which exceed the thermal stressability, for instance, of superconducting alloys.

It is an object of the invention therefore to develop reaction resins which are useful for impregnating and/or casting large-volume parts, by which all of the foregoing requirements for a cryotechnological reaction resin molded material are met to a large degree.

SUMMARY OF THE INVENTION

According to the invention, this and other objects are achieved by reaction resin molded materials produced by polymerization of di- or tri- functional epoxy compounds with polymerization catalysts which are tertiary amines of the general formula

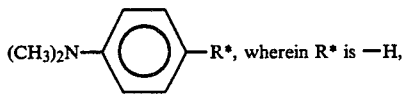

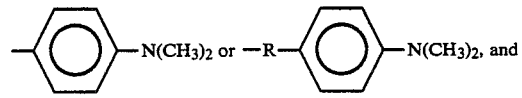

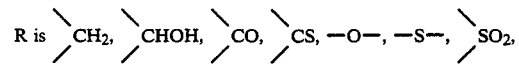

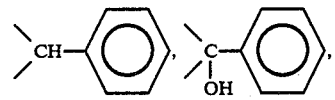

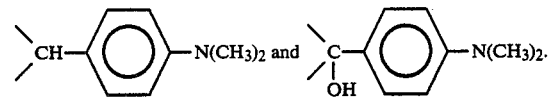

The concentration of catalyst is 0.5 to 10 mass parts and preferably 4 to 6 mass parts relative to 100 mass parts epoxy compound.

The reaction resins according to the invention and the molded materials produced therefrom substantially meet the foregoing requirements of starting viscosity, use time, adhesion, reaction shrinkage, mechanical strength, temperature-cycle resistance and radiation resistance. In addition, these reaction resins can be cross-linked at temperatures of less than 130° C., which is important particularly in connection with superconducting alloys.

The reaction resins according to the invention are based upon anionically polymerisable di- or tri-functional epoxy compounds, optionally in a mixture with monofunctional epoxides. Such epoxy compounds are, in general, aromatic polyglycidyl ethers. These aromatic polyglycidyl ethers are subjected, optionally together with fillers and also further additives, to anionic, i.e., basically initiated, polymerization. The epoxy compounds can be used here in pure form as well as also in the form of mixtures with each other.

According to the invention, the epoxy compounds used to form the reaction resins are preferably aromatic polyglycidyl ethers of the general formula

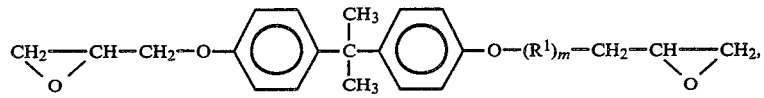

where $R^1 =$ 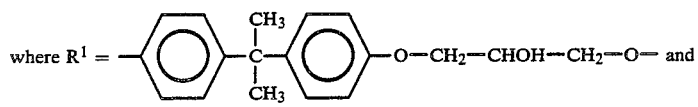 —O—CH$_2$—CHOH—CH$_2$—O— and m = 0 to 0.2 (preferably 0), and/or of the general formula

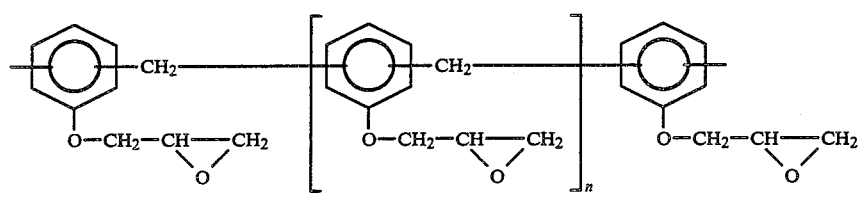

where n=0 to 1.5 (preferably 0).

Preferably, bisphenol-F-diglycidyl ether is used as the epoxy compound; thereby, polymerisates with good radiation resistance are obtained. Particularly high radiation resistance is obtained if bisphenol-F-diglycidyl ether and/or epoxidized novolak is used as the epoxy compound, and Michler's ketone (R=>CO) is used as the polymerisation catalyst, i.e., the following compound:

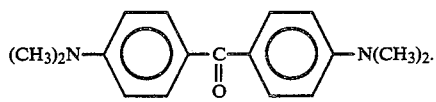

In addition to Michler's ketone, preferably the corresponding benzhydrol can be used as polymerisation catalyst. The benzhydrol derivative (R=>CHOH) has the advantage that it is incorporated into the polymer lattice in the polymerisation. In general, multicore polymerisation catalysts are preferred, and among them those with the structure

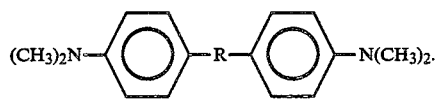

wherein R is defined as given above.

In addition to aromatic polyglycidyl ethers, the reaction resins according to the invention can be formed from aliphatic polyglycidyl ethers and optionally also aliphatic or aromatic monoglycidyl ethers, which can be present at a concentration up to about 25 mass percent and, preferably, up to 10 mass percent. Preferred are here diglycidyl ethers of the general formula

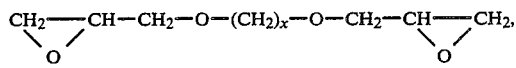

with x=4 to 10. Among these compounds, 1,4-butyleneglycoldiglycidyl ether (x=4) and 1,6-hexyleneglycoldiglycidyl ether (x=6) are particularly preferred.

The reaction resins according to the invention are particularly well suited for the impregnation of coils, for instance, for the impregnation of superconducting toroidal field coils. The epoxy compound and amine catalyst can be mixed at moderately warm temperatures and the polymerization reaction will proceed slowly. This slow reaction rate causes the viscosity of the resulting reaction resin to remain low for a sufficient period and enable impregnation of the reaction resin into the winding coil. Then, by allowing the winding coil impregnated with the reaction resin to stand at a moderately warm temperature for a sufficient time, polymerization and cross-linking are completed so that the reaction resin becomes hardened and forms the desired molded material.

The invention will be explained in greater detail with the aid of embodiment examples.

EXAMPLE 1

Reaction Resin with Michler's Ketone

For the impregnation of a toroidal field coil weighing 40 t with the outside dimensions 4.5×3.5×0.58 m$^3$ and a winding cross-section of 0.58×0.53 m$^2$, 580 kg bisphenol-F-diglycidyl ether (epoxy number EZ=0.617 mol/100 g; OH-number OHZ=0.055 mol/100 g is heated to 80° C. and reacted, while stirring, with 29 kg 4,4'-bis(dimethylamino) -benzophenone (Michler's ketone) melting point 173° C. After the Michler's ketone is dissolved, a degassing operation is performed for 2 hours at 80° C. and a pressure of less than 1 mbar. The mixture obtained has a viscosity=30 mPa. sec and is ready for use as an impregnating resin. In Table 1, the viscosity build-up=f(time) of this impregnating resin is given for T as a constant, and specifically for temperatures of 80°, 90° and 100° C. The impregnating time, i.e., the time required for complete saturation of the winding of the toroidal field coil was 28 hours (impregnating temperature, 80° C.). After the impregnation a heat hardening operation was performed for a period of 95 hours at a temperature of 100° C.

TABLE 1

| Temp. °C. | Viscosity Build-Up (Time in h) | | | | |
|---|---|---|---|---|---|
| | 10 | 20 | 50 | 70 | 90 |
| 80 | 30 mPa.s | 30 mPa.s | 35 mPa.s | 65 mPa.s | 200 mPa.s |
| 90 | 25 mPa.s | 25 mPa.s | 100 mPa.s | 1000 mPa.s | — |
| 100 | 20 mPa.s | 110 mPa.s | — | — | — |

In Table 2 are listed, for the impregnating resin given above, the processing times for limit viscosities of 100 and 200 mPa.sec at processing, i.e., impregnating temperatures of 80°, 90° and 100° C.

TABLE 2

| Temp. °C. | Limit Viscosity | |
|---|---|---|
| | 100 mPa s | 200 mPa s |
| 80 | 78 h | 90 h |
| 90 | 50 h | 54 h |
| 100 | 19 h | 22 h |

EXAMPLE 2

According to Example 1, an impregnating resin is prepared from 115 kg bisphenol-F-diglycidyl ether and 5.75 kg Michler's ketone. With this impregnating resin, a winding model with the dimensions $3 \times 0.58 \times 0.53$ m$^3$ was impregnated (impregnating time, 11 hours). Subsequently hardening was performed for 30 hours at 100° C. and for 25 hours at 130° C.

EXAMPLE 3

For comparison of the single-component impregnating resin formed from bisphenol-F-diglycidyl ether according to Examples 1 and 2 a two-component impregnating resin was prepared from bisphenol-F-diglycidyl ether and endomethylenetetrahydrophthalic-acid anhydride. For preparing this impregnating resin (Resin III), 100 MT bisphenol-F-diglycidyl ether (EZ=0.617 mol/100 g; OHZ=0.055 mol/100 g), 100 MT endomethylenetetrahydrophthalic-acid anhydride and 0.2 MT 2.4.6-tris(dimethylaminomethyl)-phenol are mixed at 80° C. while stirring. The resin obtained in this manner has a viscosity=30 mPa.sec. The processing time of this resin at 120° C. is 45 and 50 min, respectively, for the viscosity limits 100 and 200 mPa.sec. (MT=mass parts).

The single-component impregnating resin of the invention according to Examples 1 and 2 is polymerized by two different methods:
Resin I: 30 hours at 100° C. and 25 hours at 130° C.;
Resin II: 95 hours at 100° C.

The mechanical properties of the epoxy resin polymerisates obtained here from the impregnating resin, in the form of impact strength SZ (according to DIN 53 453) and determined on unfilled standard rods ($15 \times 10 \times 120$ mm$^3$); the measurement results at room temperature (300 K) and 77 K, respectively, are contained in Table 3.

The two-component impregnating resin serving for comparison (Resin III) was hardened for 7 hours at 100° C. and 15 hours at 120° C. The mechanical properties (at 300 and 77 K, respectively) determined on unfilled standard rods are likewises contained in Table 3.

TABLE 3

| | | | Mechanical Properties | |
|---|---|---|---|---|
| | | | SZ in $\frac{kJ}{m^2}$ | BF in $\frac{N}{mm^2}$ |
| Resin | I | 300 K | 50 | 130 |
| " | II | 300 K | 56 | 138 |
| " | III | 300 K | 17 | 71 |
| " | I | 77 K | 22 | 188 |
| " | II | 77 K | 29 | 168 |
| " | III | 77 K | 11[1] | 122[2] |

[1] 30% of the test rods were torn during cooling
[2] 40% of the test rods were torn in cooling

EXAMPLE 4

Adhesion Determination

For determining the adhesion of the impregnating resin according to the invention on metal surfaces, a layer of woven glass fabric was inserted between the cementing surfaces in end-face tensile samples for simulating a layer insulation, following DIN 53 288.

Specimen dimensions: outside diameter 33 mm, inside diameter 18 mm
Sample material: stainless steel
Woven glass fabric: GLS 50, $40 \times 40 \times 015$ mm silanized, desized
Resin: single-component impregnating resin as given above The impregnating resin was polymerized at 100° C. for 95 hours; then, the tensile strength was determined. The following values were obtained at different temperatures:

300 K: 58.9 N/mm$^2$;
77 K: 116.5 N/mm$^2$;
4.2 K: 38.1 N/mm$^2$

What is claimed is:

1. An unhardened reaction resin for suitable impregnating or casting of large-volume cryotechnology parts which is a two component mixture consisting essentially of an anionically polymerizable di- or tri-functional epoxy compound and a tertiary amine polymerization catalyst of the general formula

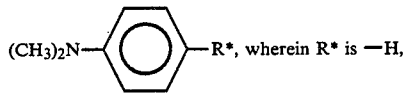
R*, wherein R* is —H,

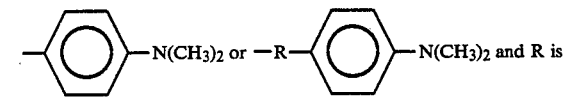
N(CH$_3$)$_2$ and R is

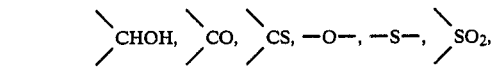
CHOH, CO, CS, —O—, —S—, SO$_2$,

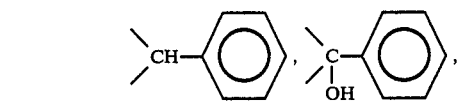

-continued

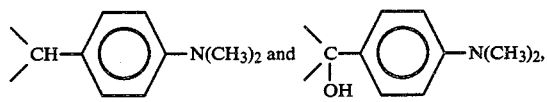

the concentration of catalyst being from about 0.5 to 10 mass parts relative to 100 mass parts epoxy compound.

2. A reaction resin according to claim 1 wherein the catalyst concentration is about 4 to 6 mass parts.

3. A reaction resin according to claim 1, wherein the tertiary amine catalyst has the formula

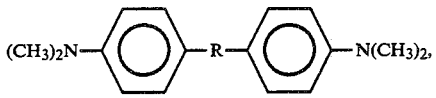

wherein R is defined as given above.

4. A reaction resin according to claim 3, wherein the catalyst is Michler's ketone having R as >CO or the corresponding benzhydrol having R as >CHOH.

5. A reaction resin according to claim 1 wherein the epoxy compound is bisphenol-F-diglycidyl ether.

6. A reaction resin according to claim 1 wherein the epoxy compound contains an aliphatic diglycidyl ether at a concentration of up to about 25 mass percent.

7. A reaction resin according to claim 6 wherein the aliphatic diglycidyl ether concentration is up to 10 mass percent.

8. A reaction resin according to claim 6 wherein the diglycidyl ether is 1,4-butyleneglycoldiglycidyl ether or 1,6-hexyleneglycoldiglycidyl ether.

* * * * *